Oct. 7, 1958    N. K. RECTOR    2,855,187
CONTACTOR TRAY

Filed Jan. 28, 1954    3 Sheets-Sheet 1

INVENTOR.
N. K. Rector
BY
ATTORNEY

Oct. 7, 1958  N. K. RECTOR  2,855,187
CONTACTOR TRAY
Filed Jan. 28, 1954  3 Sheets-Sheet 2

INVENTOR.
BY N. K. Rector
ATTORNEY

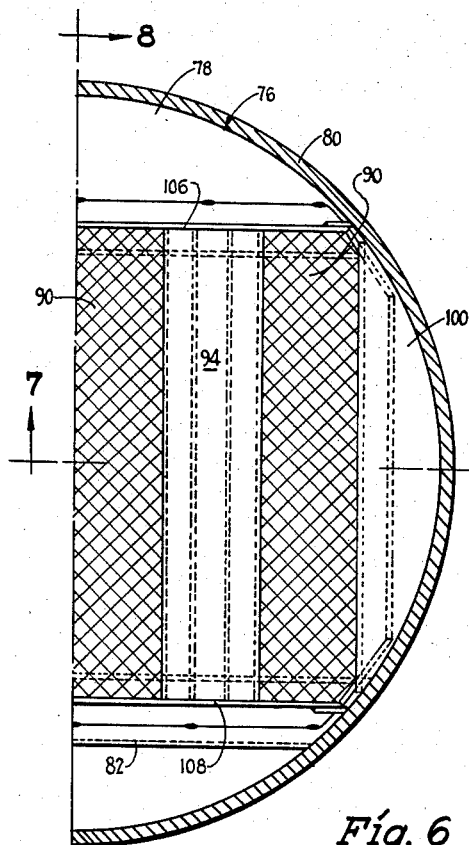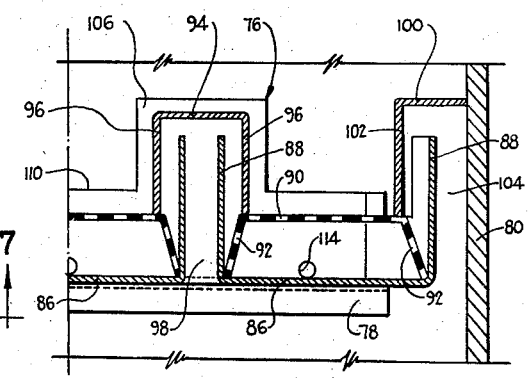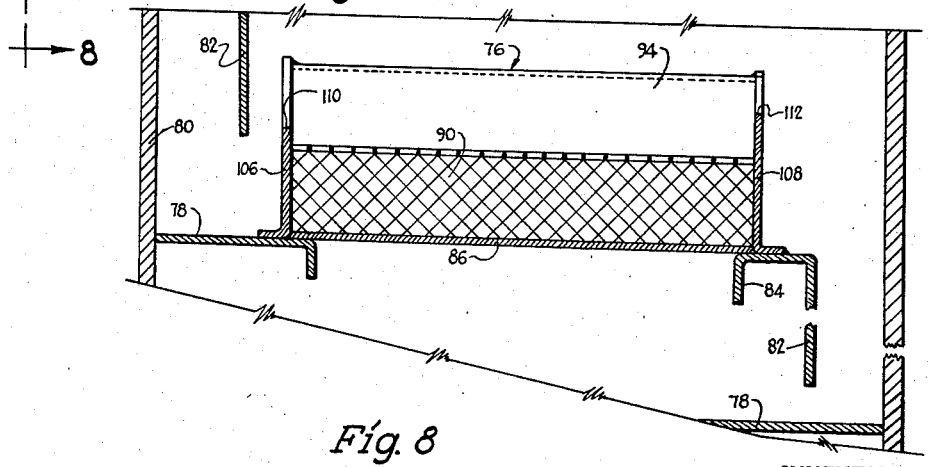

United States Patent Office 2,855,187
Patented Oct. 7, 1958

2,855,187

CONTACTOR TRAY

Norman K. Rector, Tulsa, Okla.

Application January 28, 1954, Serial No. 406,632

1 Claim. (Cl. 261—114)

This invention relates to improvements in bubble or fractionating towers, and more particularly, but not by way of limitation, to an improved bubble tray adapted for use in a fractionating tower or the like.

As it is well known in the art of petroleum refining, fractionating towers consist, in the main, of a vertical shell having a plurality of super-imposed bubble or contactor trays distributed throughout substantially the entire length of the shell. Liquid is injected into the upper end of the tower to descend from bubble tray to bubble tray and a vapor mixture is injected at the lower end of the shell. The vapor mixture passes upwardly through the various bubble trays and contacts the descending liquid, whereby the mixture is treated. The usual bubble tray is formed out of sheets of metal having a plurality of small apertures extending transversely therethrough. The liquid is retained in a body above the bubble trays and the gas escapes upwardly through the apertures to contact the liquid. This type of bubble tray provides an excessive pressure drop for the gas as it passes therethrough. Furthermore, the trays are ordinarily arranged within the shell in such a manner that the passageways for the ascending vapors are unduly restricted.

The present invention contemplates a novel bubble or contactor tray formed from interlocking channel members and wire-like grids. The channel members and grids are so arranged to utilize the maximum of the cross sectional area of a fractionating tower for the upward passage of vapors. The grids are provided with a maximum of openings or apertures to reduce the amount of pressure drop of vapor passing therethrough to a minimum. In one modification of the present invention, the channel members are bolted in a novel manner to facilitate repair and cleaning of the bubble trays.

An important object of this invention is to reduce the pressure drop of gas passing through a fractionating tower or the like to a minimum.

Another object of this invention is to materially increase the capacity of fractionating towers and the like.

A further object of this invention is to provide a bubble tray formed by interlocking channel members and having novel means for securing the tray in a fractionating tower.

Another object of this invention is to utilize the maximum cross sectional area of a bubble or fractionating tower for the passage of vapor upwardly therethrough.

And another object of this invention is to provide a bubble tray for fractionating towers and the like having an adjustable weir to obtain the maximum liquid capacity.

A still further object of this invention is to provide a bubble tray wherein all vapors contacting the tray are constrained to pass through grid members and obtain the maximum vapor to liquid contact.

Other objects and advantages of the invention will be evident from the following detailed description, read in conjunction with the accompanying drawings, which illustrate my invention.

In the drawings:

Figure 6 is a view similar to Fig. 2 illustrating a modified bubble tray.

Figure 7 is a cross sectional view taken along lines 7—7 of Fig. 6.

Figure 8 is a cross sectional view taken along lines 8—8 of Fig. 6.

Figure 1:
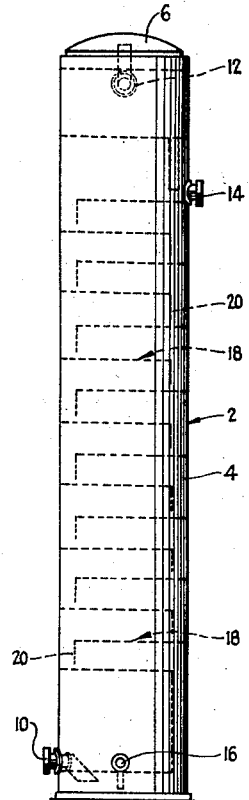
Figure 1 is a vertical elevational view of a fractionating tower.

Referring to the drawings in detail, and particularly Fig. 1, reference character 2 generally designates a fractionating tower comprising a vertical shell 4 having end closure members 6 and 8. A gas inlet 10 is provided in the lower portion of the shell 4 and a gas outlet 12 is provided in the upper end of the shell 4. Conversely, an oil or liquid inlet 14 is provided near the upper end of the shell 4 and a liquid outlet 16 is provided at the lower end.

A plurality of horizontal trays, generally indicated at 18, and having downwardly extending baffles 20 are secured in vertical spaced relation in the shell 4 throughout substantially the entire height thereof. It will be observed that the baffle 20 of each tray 18 is arranged at the opposite side of the shell 4 from the baffles 20 of the adjacent trays 18, thus providing the maximum flow path for the treating liquid as will be more fully hereinafter set forth.

Figure 2:
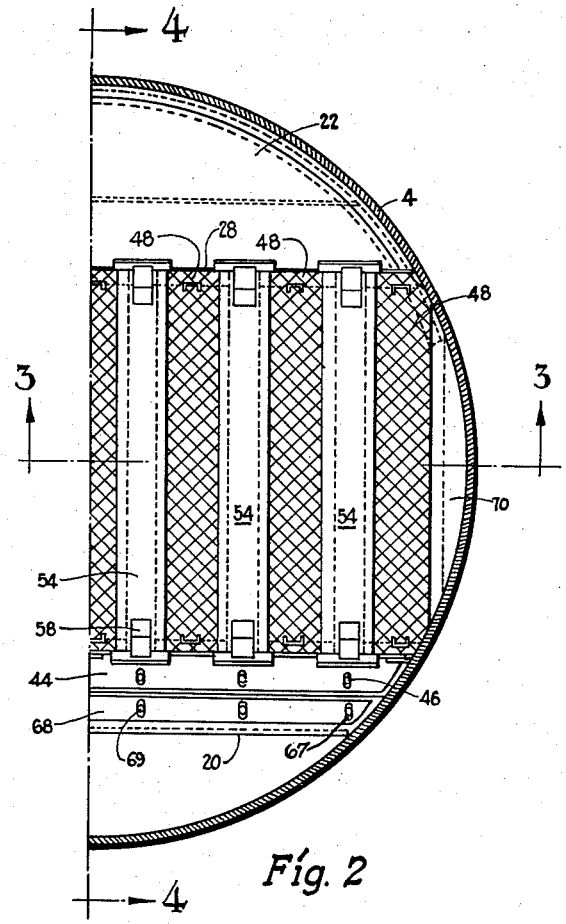
Figure 2 is a partial horizontal cross sectional view of the tower shown in Fig. 1.
Figure 4:
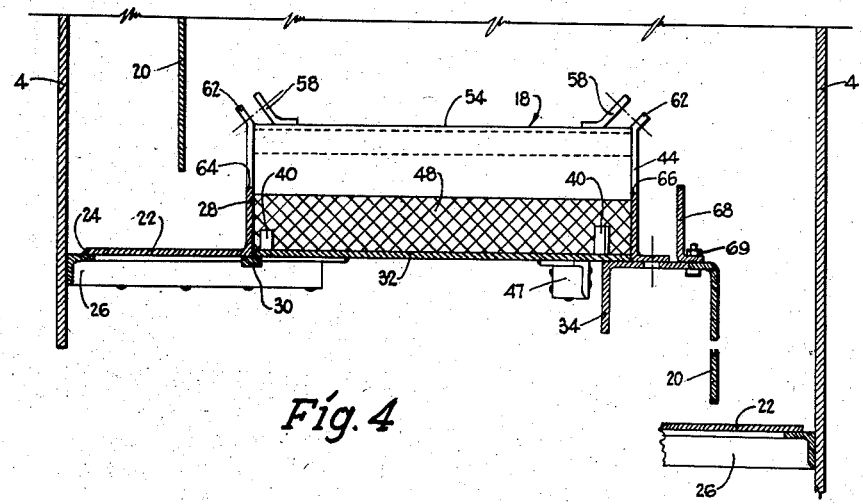
Figure 4 is a cross sectional view taken along lines 4—4 of Fig. 2.

As shown in Figs. 2 and 4, each bubble tray 18 consists of a horizontal deck plate 22 arranged at the opposite side of the shell 4 from the respective baffle. The outer edge 24 of each deck plate 22 is curved to conform to the inner periphery of the shell 4 and is welded or otherwise rigidly secured to an angled member 26, which is in turn rigidly secured to the shell 4. A bend is provided in each deck plate 22 in spaced relation from the shell 4 to form an upstanding flange 28 extending across the shell 4 in the same direction as the baffle plate 20. The deck plates 22 are provided to receive liquid flowing downwardly from the adjacent upper tray 18 as will be more fully hereinafter set forth. It will be observed that the baffle 20 of the upwardly adjacent tray 18 is disposed above the deck plate 22.

Figure 5:
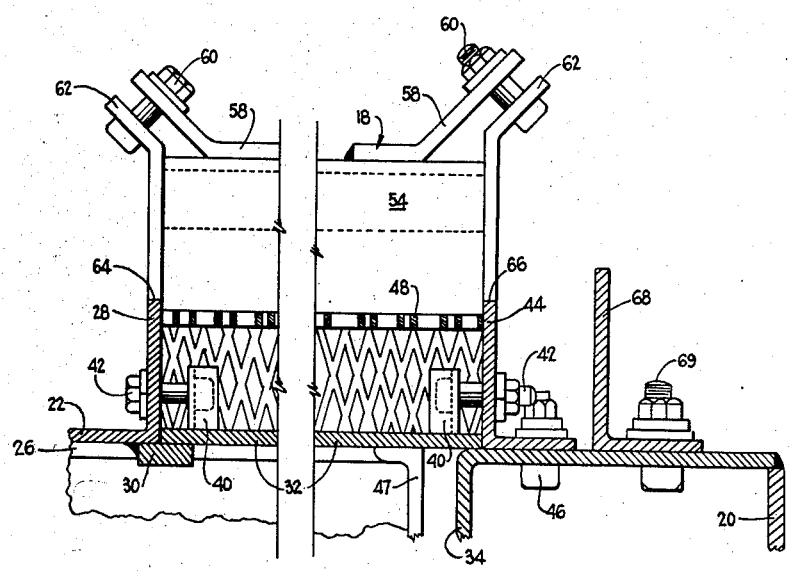
Figure 5 is an enlarged detailed cross sectional view of portions of the tray shown in Figs. 2, 3 and 4.

A supporting strip 30 is welded or otherwise rigidly secured to the inner end of each deck plate 22 and extends inwardly in the shell 4 to receive one end of a plurality of channel members 32. An L-shaped supporting member 34 is secured to the baffle plate 20 and extends transversely across the shell 4 in spaced relation to the strip 30, and on a level with the strip 30, to support the opposite ends of the channel members 32. As is more clearly shown in Fig. 3, the channels 32 are disposed in horizontally spaced relation to provide vertical passageways 36 therebetween and with their leg or flange members 38 extending upwardly. Brackets 40 (see also Fig. 5) are secured in each end of each channel member 32 to receive bolts 42 for connection with the vertical portion 28 of the deck plate 22 and a vertical support plate 44 secured to the support member 34. Thus, the channel members 32 are removably supported in the shell 4. Furthermore, the vertical plates 44 are adjustably secured by bolts 46 to the respective support members 34, thereby providing longitudinal adjustment of the channels 32. The outermost channels 32 may be additionally supported by small clips 47 arranged around the shell 4 as shown in Figs. 4 and 5.

A grid 48 (Fig. 3), having its side edges 50 bent downwardly, is disposed in each channel member 32. The grids 48 are preferably formed out of heavy wire-like material, such as expanded metal, with diamond shaped openings as shown in Fig. 5, to provide a maximum contact of the vapor and treating liquid as will be hereinafter set forth. The edge portions 50 are bent downwardly in such a manner to contact the respective channel member 32 adjacent the upturned flanges thereof, and the grids 48 are of a length to extend throughout the length of the channels 32 from the portion 28 of the deck plate 22 to the vertical supporting plate 44. A relatively small weep hole 52 (Fig. 3) is formed in the deck plate portion 28 and in the plate 44 in alignment with each grid 48 to provide an equalizing flow of liquid through the plate 44 and deck plate portion 28 during operation of the tower 2. However, only a small portion of either the treating liquid or vapor will pass through the weep holes 52.

Figure 3:
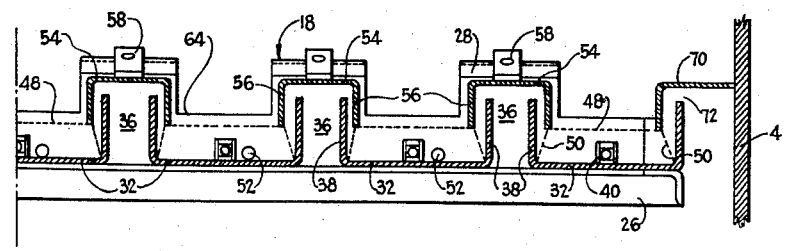
Figure 3 is a cross sectional view taken along lines 3—3 of Fig. 2.

Another series of channel members 54, having their legs or flanges 56 turned downwardly, extend transversely across the shell 4 from the deck plate portion 28 to the plate 44. As shown in Fig. 3, the flanges 56 of each channel 54 extend over the adjacent flanges 38 of each pair of channel members 32 and rest upon the respective grids 48 adjacent the downturned edges 50 thereof. Thus, each channel 54 defines a passageway over the entire length of the channels 32 providing communication between the passageways 36 and the grids 48. An upwardly and outwardly extending lug 58 (Figs. 4 and 5) is provided on each end of each channel 54 to receive bolts 60 extending from mating lugs 62. The lugs 62 are formed on the upper ends of the plates 44 and deck plate portions 28. It will be readily seen that the bolts 60 and cooperating lugs 58 and 62 provide means for removably securing the channels 54 in the shell 4, whereby the channels 54 are thrust downwardly to firmly seat on the grids 48 and prevent by-passing of the ascending vapor.

Notches 64 (Figs. 3 and 5) are formed in the upper edge of each deck plate portion 28 in alignment with, but slightly above, each grid 48 to provide passageways for the descending liquid onto the grids 48. Similarly, notches 66 are provided in the vertical plate 44 in alignment with each grid 48 to form discharge openings for the liquid. However, the vertical plate 44 and deck plate portion 28 effectively cover the opposite ends of the grids 48, as well as the channels 32 and 54, to prevent vapor from flowing outwardly through the ends of either of these elements and by-passing the grids 48. A weir 68 is adjustably secured to the support member 34 by bolts 69 outwardly of the vertical plate 44 to control the height of the liquid above each tray 18. The bolts 69 extend through slots 76 (Fig. 2) provided in the weir 68 whereby the weir 68 may be adjusted toward or away from the plate 44, as desired. Each weir 68 extends transversely across the shell 4 and in contact with the inner periphery of the shell 4 at each end of the weir to prevent by-passing of the liquid. Also, a horizontal plate 70 (Fig. 3) is secured to the inner periphery of the shell 4 at each side of each tray 18 in a direction at right angles to the deck plates 22 and baffles 20. The plates 70 are bent downwardly into the outermost channels 32 and extend into contact with the adjacent grids 48 to prevent a by-pass of either the vapor or the treating liquid. The plates 70, in fact, provide passageways 72 for the ascending vapor.

Operation

In operation of the fractionating tower 2, a treating liquid is injected through the inlet 14 and flows downwardly over the trays 18 into the lower portion of the shell 4 where it is withdrawn through the outlet 16. Simultaneously, the vapor being treated is injected through the inlet 10 and ascends through the bubble trays 18 for withdrawal through the outlet 12.

As the treating liquid contacts the deck plate 22 of each tray 18, it accumulates and is directed through the notches 64 over and into the grids 48. Simultaneously, the vapor ascending through the shell 4 will flow through the passageways 36, channels 54 and downwardly into the grids 48. Also, and as previously noted, a portion of the gas will flow through the passageways 72 into the outermost grids 48. It will be noted that as the gas is passed through each tray 18, it is constrained to bubble through the liquid two times. First, the gas must pass through the edge portions 50 of the grids, and then through the upper portion of the grids proper. Thus, the liquid-vapor contact will be materially increased. It will also be noted that the grids 48, being formed out of a wire-like material, will provide greater openings for the passage of the gas and reduce the gas pressure drop to a minimum, with a resulting increased capacity of the tower 2.

As the liquid level in each tray 18 exceeds the height of the notches 66 in the vertical plate 44, it will flow outwardly onto the support member 34. And when the liquid level exceeds the height of the weir 68, it will flow downwardly between the respective baffle 20 and the shell 4 onto the deck plate 22 of the next lower bubble tray 18 where the contacting cycle is repeated. The weir 68 is, of course, of sufficient height to completely submerge the respective tray 18 in the descending liquid. All of the liquid must flow completely across each bubble tray 18 before it can descend to the next lower bubble tray, and all of the gas must pass through the descending liquid at each of the bubble trays 18.

In smaller fractionating towers and the like, it is frequently impractical to use a removable bubble tray. For this type of installation, I provide a modified bubble tray generally indicated at 76 and shown in Figs. 6, 7 and 8. The tray 76 comprises a flat deck plate 78 (Fig. 8) at one side of the shell 80 and a vertical baffle 82 at the opposite side of the shell. The deck plate 78 is curved at its outer edge to conform to the inner periphery of the shell 80 and is rigidly secured to the shell, preferably by welding. The upper end portion 84 of the baffle 82 is bent inwardly and then downwardly and extends across the shell 80 to facilitate welding thereof to the shell.

A plurality of channel members 86, having upstanding legs or flanges 88, are disposed with their opposite ends on the deck plate 78 and the upper portion 84 of the baffle 82. The channels 86 are arranged in horizontally spaced relation (Fig. 7) and provide receptacles for wire grids 90 which are formed out of the same material as the grids 48 in the trays 18. The outer side portions 92 of the grids 90 are bent downwardly and are of a size to rest on the respective channel member 86 adjacent the flanges 88 thereof. It will also be noted in Fig. 8 that the grids 90 are of a length corresponding to the channels 86.

Another series of channels 94, having downturned legs or flanges 96, are placed over the adjacent flanges 88 of each pair of channels 86 and rest on the respective grid members 90. The channels 94 are of a length corresponding to the channels 86, thereby cooperating with the adjacent legs 88 of the channel members 86 to provide passageways 98 from the lower face of each tray 76 upwardly and then downwardly to the grids 90. Also, a plate member 100 is welded or otherwise rigidly secured to each side of the shell 80 in alignment with the channels 86 and has a depending flange 102 extending downwardly into the outermost channels 86 in contact with the outermost grids 90. The plates 100, therefore, provide passageways 104 upwardly around each side of the bubble tray 76 in communication with the outermost grids 90.

A transverse vertical plate 106 is rigidly secured to the deck plate 78 in contact with one end of the channels 86, grids 90 and channels 94, and a similar vertical plate 108 is secured to the baffle 82 in contact with the opposite ends of the channels 86, grids 90 and channels 94. The channels 94 are preferably welded to the plates 106 and 108. Notches 110 are cut in the upper end of the plate 106 in such a manner to provide liquid passageways slightly above the grids 90. Also, notches 112 (Fig. 8) are cut in the plate 108 to provide discharge openings for the liquid, which then flows downwardly between the shell 80 and the baffle 82. The notches 112 are at a greater height than the notches 110, thereby permitting the plate 108 to serve as a weir for the bubble tray 76 and regulate the height of the liquid on the tray.

Relatively small weep holes 114 (Fig. 7) are formed in the plates 106 and 108 in alignment with the grids 90. However, only a very small portion of the vapor or liquid may pass through the apertures 114. The greater portion of the vapor will be deflected by the plates 106 and 108 and be forced to flow directly upward through the grids 90.

The operation of the modified bubble tray 76 is similar to the operation of the preferred bubble tray 18, in that the liquid descends in the shell 80 onto the respective deck plates 78 where it accumulates and flows through the notches 110 onto and through the grids 90. Simultaneously, the ascending vapors flow through the passageways 98 and 104 and through the grids 90 to bubble through the treating liquid. Thus, the vapors pass through the grids 90 twice at each bubble tray 76 to provide a maximum liquid-vapor contact. When the liquid above the bubble tray 76 exceeds the height of the notches 112, it flows outwardly and then downwardly between the shell 80 and the baffle plate 82 onto the deck plate 78 of the next lower bubble tray 76.

Although I have described my novel bubble tray as used in a fractionating tower, it will be understood by those skilled in the art that the tray may be utilized in substantially any type of bubble tower for the treatment of an ascending vapor by a descending liquid.

From the foregoing, it is apparent that the present invention provides a novel bubble tray wherein the pressure drop of vapor passing through the tray will be reduced to a minimum. The diamond shaped grids provide the maximum passageways for the ascending vapor to obtain the maximum liquid-vapor contact and increase the capacity of the tower in which the trays are used. Furthermore, the entire cross sectional area of a tower may be utilized for the passage of the vapor and all of the vapor will be constrained to pass through the grids and the liquid contained on each tray. It is also apparent that the present invention provides, in one embodiment, a novel weir for adjusting the capacity of the bubble tray and that the grids are rigidly, although removably, secured in the tray.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A tray for a bubble tower having a liquid descending and a vapor ascending therethrough, comprising a horizontal deck plate in one side of the tower, a downwardly extending baffle plate secured in the opposite side of the tower, a plurality of horizontally spaced channel members extending transversely in the tower and resting on the deck plate and the baffle, said channels having upturned flanges, a wire-like grid in each channel member extending throughout the length thereof, the side portions of said grids being turned downwardly to contact the respective channel adjacent the upturned flanges thereof, a second channel arranged over the adjacent flanges of each pair of the first mentioned channels and extending throughout the length thereof, said second channels having downturned flanges contacting the adjacent grids to form vapor passageways from the underside of the tray into the downturned edges of the grids, vertical plates secured to the baffle plate and the deck plate arranged to cover the opposite ends of the channel members and grids, a weir adjustably secured to the baffle plate for regulating the height of liquid on the tray, mating lugs on each end of the second mentioned channels and the vertical plates extending upwardly and outwardly, and bolts extending through said lugs, whereby the second mentioned channels may be thrust downwardly onto the grids.

References Cited in the file of this patent

UNITED STATES PATENTS

| | | |
|---|---|---|
| 1,782,862 | Wagner | Nov. 25, 1930 |
| 1,876,800 | Van Acker | Sept. 13, 1932 |
| 1,882,104 | Wallis | Oct. 11, 1932 |
| 2,470,652 | Scofield | May 17, 1949 |